(12) United States Patent
Umeda

(10) Patent No.: US 6,753,979 B2
(45) Date of Patent: Jun. 22, 2004

(54) DATA PROCESSING APPARATUS AND METHOD, AND STORAGE MEDIUM

(75) Inventor: Kiyoshi Umeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 10/040,489

(22) Filed: Jan. 9, 2002

(65) Prior Publication Data

US 2002/0095629 A1 Jul. 18, 2002

(30) Foreign Application Priority Data

Jan. 16, 2001 (JP) .......................................... 2001-007821

(51) Int. Cl.[7] .............................................. G06R 15/00
(52) U.S. Cl. ...................................... 358/3.26; 358/450
(58) Field of Search ................................. 358/450, 451, 358/3.26, 1.18; 714/782, 758

(56) References Cited

U.S. PATENT DOCUMENTS 5,652,626 A    7/1997   Kawakami et al. ......... 348/463
6,094,276 A  * 7/2000   Yamaguchi ................. 358/1.15
6,144,324 A  * 11/2000  Sasaki ........................ 341/94
2002/0095629 A1 * 7/2002 Umedo ........................ 719/701
2002/0191501 A1 * 12/2002 Ueno ......................... 369/44.13

FOREIGN PATENT DOCUMENTS

JP            7-123244     5/1995    .......... H04N/1/387

* cited by examiner

*Primary Examiner*—Jerome Grant, II
(74) *Attorney, Agent, or Firm*—Fitzpatrick, Cella, Harper & Scinto

(57) ABSTRACT

The invention enables extraction of additive information from an image with high precision, in a case additive information is multiplexed to the image and printed. When additive information is multiplexed to image data subjected to printing, header information including information indicative of a size of the additive information and error correction code information is generated and multiplexed by multiplexing unit 102. Actual additive information is divided into blocks, each of which is accompanied by error correction code information, and subjected to multiplexing by the multiplexing unit 102. The resultant data is printed by the printer 104.

11 Claims, 11 Drawing Sheets

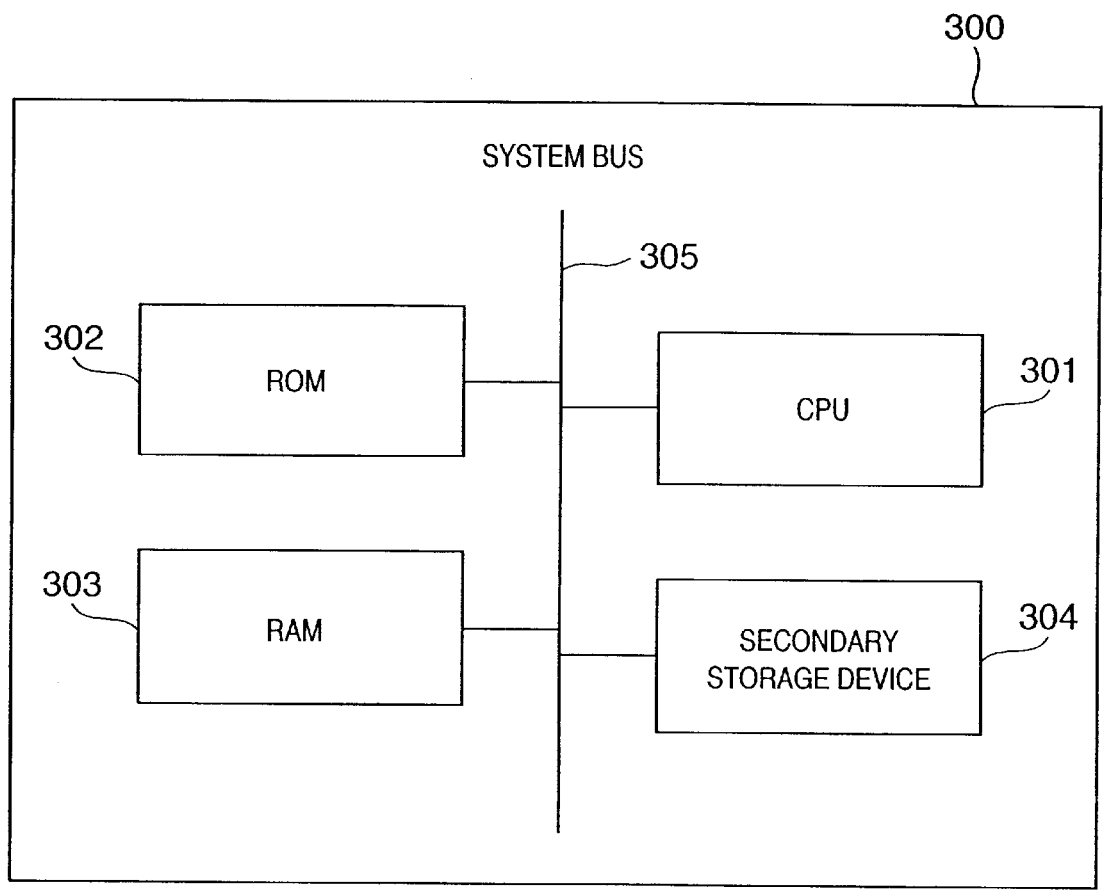

ADDITIVE INFORMATION x(i)

MULTIPLEX INFORMATION y(j)

FIG. 7

| TYPE OF PAPER | MEDIUM IDENTIFICATION PARAMETER p | AVERAGE DETECTION RATE | CORRECTION CODE |
|---|---|---|---|
| REGULAR PAPER | 0x01 | 97.0% | BCH(255, 133, 33) |
| POSTCARD DESIGNED FOR INKJET PRINTER | 0x02 | 98.0% | BCH(255, 155, 27) |
| HIGHH QUALITY SPECIAL-PURPOSE PAPER | 0x04 | 99.0% | BCH(255, 179, 21) |
| GLOSSY PAPER | 0x08 | 99.5% | BCH(255, 215, 11) |

700

HEADER PORTION

MULTIPLEX INFORMATION y(j)

DATA PROCESSING APPARATUS AND METHOD, AND STORAGE MEDIUM

FIELD OF THE INVENTION

The present invention relates to a data processing apparatus and method as well as storage medium, and more particularly, to an apparatus which enables multiplexing of additive information to an image subjected to printing, and a data processing apparatus and method as well as storage medium for reading the printed image and extracting the additive information.

BACKGROUND OF THE INVENTION

Conventionally increasing studies have been conducted for multiplexing additive information to image data, which is different from the additive information, in such a manner that the additive information keeps a visually low profile.

Recently, a technique known as the digital watermarking is about to be standardized. According to this technique, additive information, e.g., an owner of an image, authorization/non-authorization of the use of the image and so on, is multiplexed to image data such as photographs or drawings in such a manner that the additive information is visually difficult to identify, and the image data is distributed through networks such as the Internet.

In other fields of application of the technique, as image output devices such as copying machines, printers and the like have become more high-quality oriented, there is a technique available for embedding additive information to an image in order to specify an output device and machine number from the outputted image printed on paper, for the purpose of preventing unauthorized forgery of bills, stamps, securities and so on.

For instance, Japanese Patent Application Laid-Open (KOKAI) No. 7-123244 proposes a data multiplexing technique of embedding additive information to a color difference component having a visually low sensitivity and a high-frequency area of a saturation component.

However, with the use of the above-described methods, it is extremely difficult to multiplex a large volume of information to a printout in such a manner that a change in the printed image is visually unrecognizable.

As means to solve the above problem, the assignee of the present invention has proposed the following method. Taking into consideration the characteristics of printer engines such as thermal-dissolving-type transferring printers, laser printers or the like, a texture generated by an error diffusion method, which is one of the pseudo-tonality processing, is utilized, and a combination of quantization values that is never produced in the normal pseudo-tonality processing is artificially produced to realize code embedding. Since this method only causes microscopically small changes in the shape of the texture, the visual image quality is not deteriorated. In addition, with the use of a method which changes a quantization threshold value of the error diffusion method, visual density values of areal tonality can be maintained, thus realizing extremely easy multiplexing of different types of signals.

FIGS. 11A and 11B are block diagrams showing a construction of an image processing system according to an invention proposed by the assignee of the present invention. In FIG. 11A, reference numerals 1100 and 1101 denote input terminals. Multi-tone image data is inputted to the input terminal 1100, and additive information to be embedded to the image data is inputted to the input terminal 1101. The additive information is different from the image data inputted to the input terminal 1100. For instance, copy right information of an image inputted to the input terminal 1100, or other information are inputted. An additive information multiplexing unit 1102 embeds additive information to image data in such a manner that the additive information is visually difficult to identify. The additive information multiplexing unit 1102 controls quantization of inputted multi-tone image data in addition to the additive information multiplexing. A printer 1103 prints out data generated by the additive information multiplexing unit by a printer engine. Assume that the printer used herein is an inkjet printer, laser printer or the like which realizes tonality expression by pseudo tonality processing.

The printout is subjected to scanning by a scanner 1104 in FIG. 11B to read information on the printout. An additive information separation unit 1105 separates the embedded additive information and outputs it to an output terminal 1106.

However, the foregoing technique has the following problems.

The above-described technique enables multiplexing a larger volume of information to image data compared to the conventional method, without deteriorating quality of the image data. However, a reading rate is not always 100% when decoding the multiplexed information. Causes of reading errors include the nature of an image which multiplexes arbitrary information, printer's ink discharge precision, reading precision of a scanner used in decoding image data, quality of a print medium, the type of ink used, durability of toner, smudges on printed surface, and so forth. Because of these reasons, it is extremely difficult to realize a multiplexing technique which ensures 100% decoding.

SUMMARY OF THE INVENTION

The present invention has been proposed in view of the above problems, and has as its object to provide a data processing apparatus, method, and storage medium which enable extraction of additive information from a printed image with high precision in a case where additive information is multiplexed to the image and printed.

In order to solve the above-described problem and achieve the object, for instance, the data processing apparatus according to the present invention has the following configuration.

More specifically, the present invention provides a data processing apparatus for multiplexing additive information to image data and printing the image data by predetermined printing means, comprising: header generation means for generating header block information including at least information indicative of a size of the additive information and information for error correction; and block generation means for dividing the additive information into blocks each having a predetermined size, and generating block information including error correction code information by adding error correction code information to each block, wherein the information generated by said header generation means and block generation means is multiplexed to the image data and printed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram of a controller according to the embodiment;

FIG. 7 is an error correction parameter table, shown as an example, according to the second embodiment;

DETAILED DESCRIPTION OF THE PREFERRED EMBODIMENTS

Preferred embodiments of the present invention will now be described in detail in accordance with the accompanying drawings. Note that the image processing apparatus of the following embodiments is efficient if incorporated as printer driver software or application software in a computer to mainly generate image data to be outputted to a printer engine. It is also effective to incorporate the image processing apparatus in a copying machine, facsimile apparatus, printer main body or the like as hardware or software.
[First Embodiment]

Figure 1A:
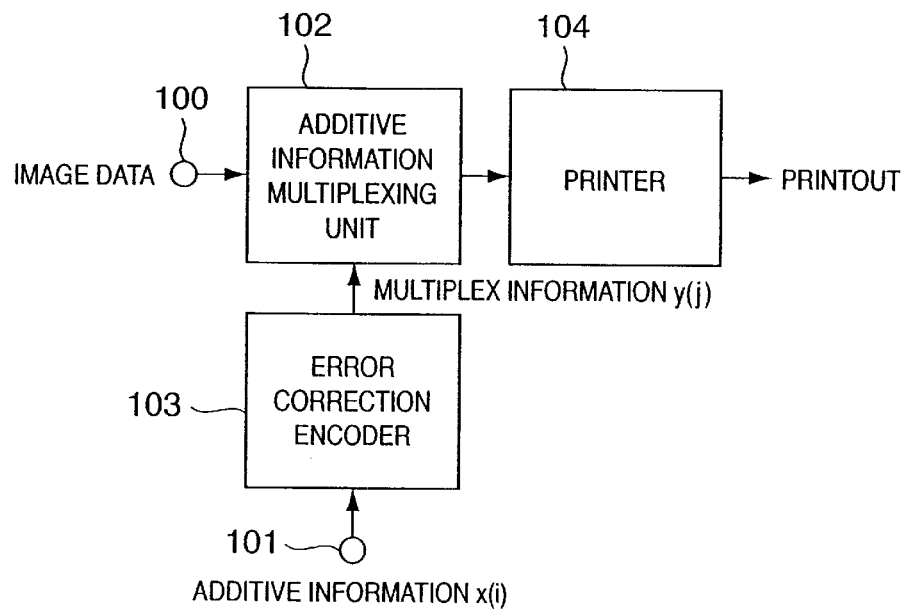
FIGS. 1A and 1B are block diagrams of a data multiplexing apparatus according to a first embodiment of the present invention.
Figure 1B:
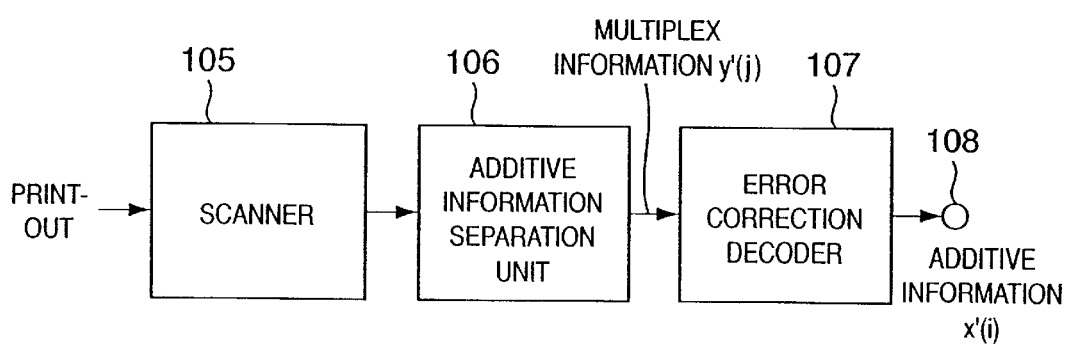

FIGS. 1A and 1B are block diagrams showing a construction of an image processing system according to the first embodiment.

In FIG. 1A, reference numerals 100 and 101 denote input terminals. Multi-tone image data is inputted to the input terminal 100, and additive information x(i) having "size" bit, which is to be embedded into the image data, is inputted to the input terminal 101. The additive information x(i) is different from the image data inputted to the input terminal 100. For instance, copy right information of the image inputted to the input terminal 100, or other information are inputted. The additive information is inputted to an error correction encoder 103 for error correction processing.

Various error correction codes have been proposed. Typical examples are the Reed-Solomon code, BCH code, Fire code, Peterson code and so on. Although any of these codes may be used in the error correction method, the first embodiment employs the BCH code, which has already been adopted by various systems for its easy structure and high encoding rate. Since the algorithm of the BCH code has already been described in many other places, it will not be described herein. Note that the present embodiment expresses the BCH code as BCH(n, k, d). This indicates that the code length of the BCH code is n bit, including k bit of information and n-k parity bits, and that t=[d/2] bit of errors can be corrected with this construction. [ ] indicates a maximum integer which does not exceed the number within [ ]. The error correction encoder 103 adds the parity bit to inputted additive information x(i), and outputs multiplexed information y(j){j>size}.

An additive information multiplexing unit 102 embeds the multiplex information y(j) to image data in such a manner that the multiplex information is visually difficult to identify. The additive information multiplexing unit 102 controls quantization of the inputted multi-tone image data in addition to the additive information multiplexing. A printer 104 outputs data, generated by the additive information multiplexing unit, by a printer engine. Assume that the printer used herein is an inkjet printer, laser printer or the like which realizes tonality expression by pseudo tonality processing.

The printout is subjected to scanning by a scanner 105 in FIG. 1B to read information thereon. An additive information separation unit 106 separates the embedded additive information and inputs the read multiplex information y'(j) to an error correction decoder 107. The error correction decoder 107 performs error correction processing, using the same technique as that of the error correction encoder 103, and outputs the obtained additive information x'(i) to an output terminal 108.

Figure 2:
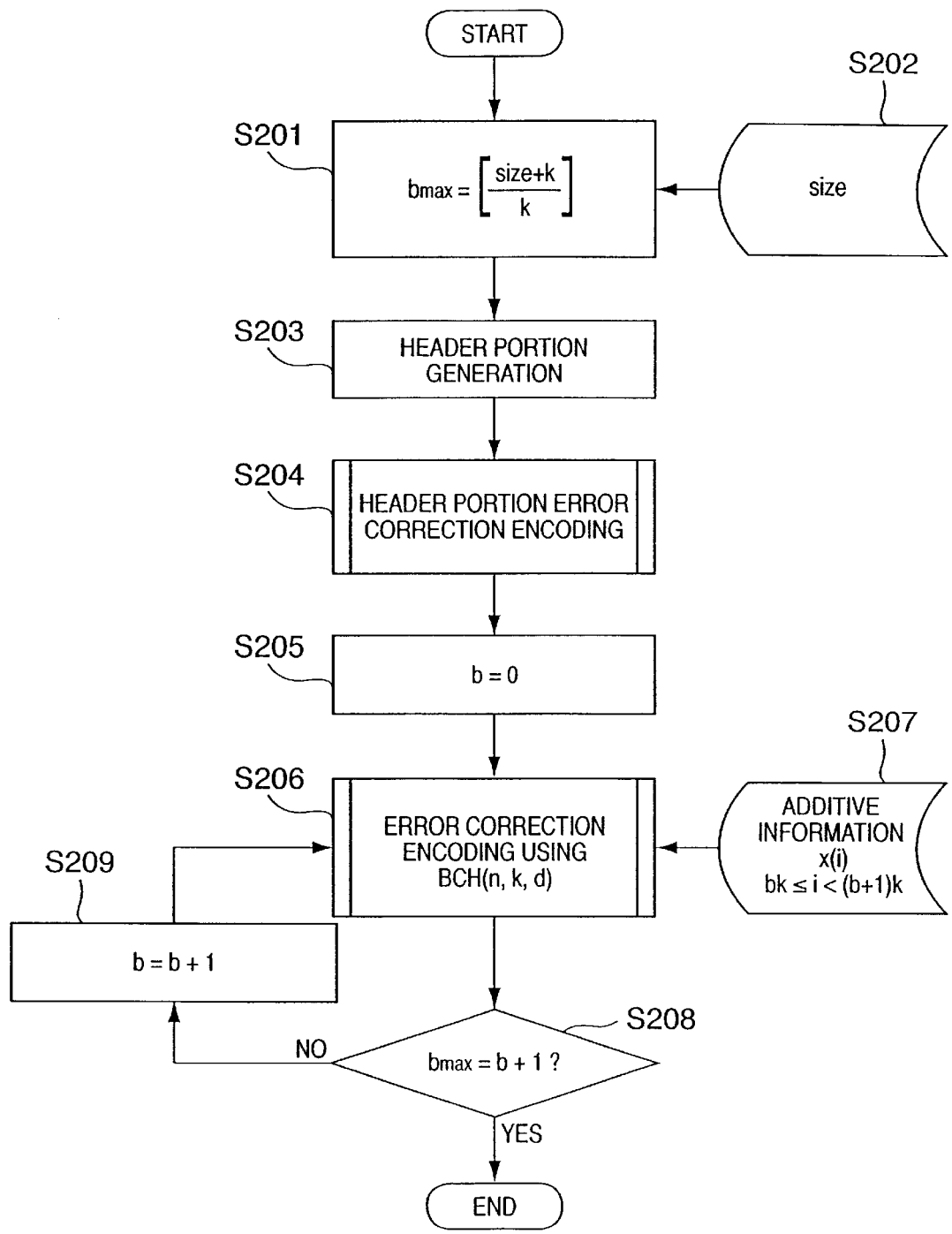
FIG. 2 is a flowchart showing processing steps of an error correction encoder 103.

FIG. 2 is a flowchart showing processing steps of the error correction encoder 103. Hereinafter, each component will be described according to this flowchart. Note that the processing shown in the flowchart in FIG. 2 is executed by a controller, such as the controller 300 in FIG. 3. Referring to FIG. 3, a CPU 301, ROM 302, RAM 303, secondary storage device 304 such as hard disk or the like, are connected to a system bus 305. The secondary storage device 304 stores a program that realizes the flowchart in FIG. 2, which is loaded to the RAM 303 and executed by the CPU 301 upon operation. Needless to say, configurations for inputting image data and additive information are also included although not shown in FIG. 3. As means for inputting image data, an image scanner or a network interface for downloading image data from a server on a network may be provided. As means for inputting additive information, a keyboard for inputting additive information or a network interface for downloading a document may be provided.

Referring back to FIG. 2, at step S201, the number of blocks $b_{max}$ used for error correction with BCH(n, k, d) is obtained by the following equation based on the "size" indicative of the number of bits of the inputted additive information x(i).

$$b_{max}=[(size+k)/k] \qquad (1.1)$$

Figure 4A:
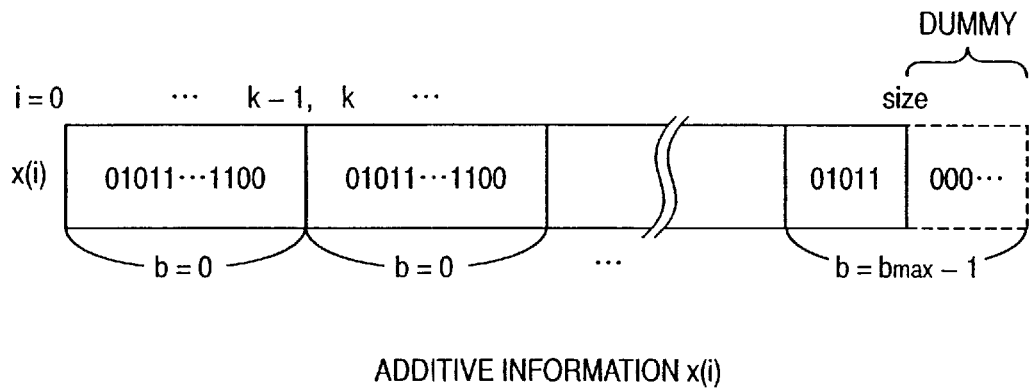
FIGS. 4A and 4B are views showing an example of a bit stream before and after error correction encoding according to the embodiment.

The equation is now described with reference to FIG. 4A. FIG. 4A shows additive information x(i) divided in unit of k bit, which is the unit of encoding block of additive information x(i). As is well known, since the BCH code is a block code, n-k parity bit is added to k bit. In a case where the "size" is not divisible by k, size-k($b_{max}$-1) bit remains in the ($b_{max}$-1)th block counted from the top (b=0) of the block. According to this embodiment, k·$b_{max}$-size bits of 0 are added to the last block of additive information to construct ($b_{max}$)th block.

Next, a header portion of multiplex information is generated at step S203. In this embodiment, k bit which is the number of information bits in one encoding block is assigned to a header, and the number of bits "size" of additive information is stored in the header. By virtue of this, at the time of decoding, the number of bits "size" of additive information can be obtained by first decoding the top of the encoded block (n bit). As a result, the number of dummy bits 0, added to the last block, can also be obtained. Although the first embodiment uses the number of bits "size" of additive information as the data to be stored in the header, the number of bytes of additive information may be stored in the header.

At step S204, error correction encoding using BCH(n, k, d) is performed on the header. At step S205, initialization (b=0) is performed. At steps S206–S209, error correction encoding using BCH(n, k, d) is performed on all the blocks of additive information x(i).

Figure 4B:
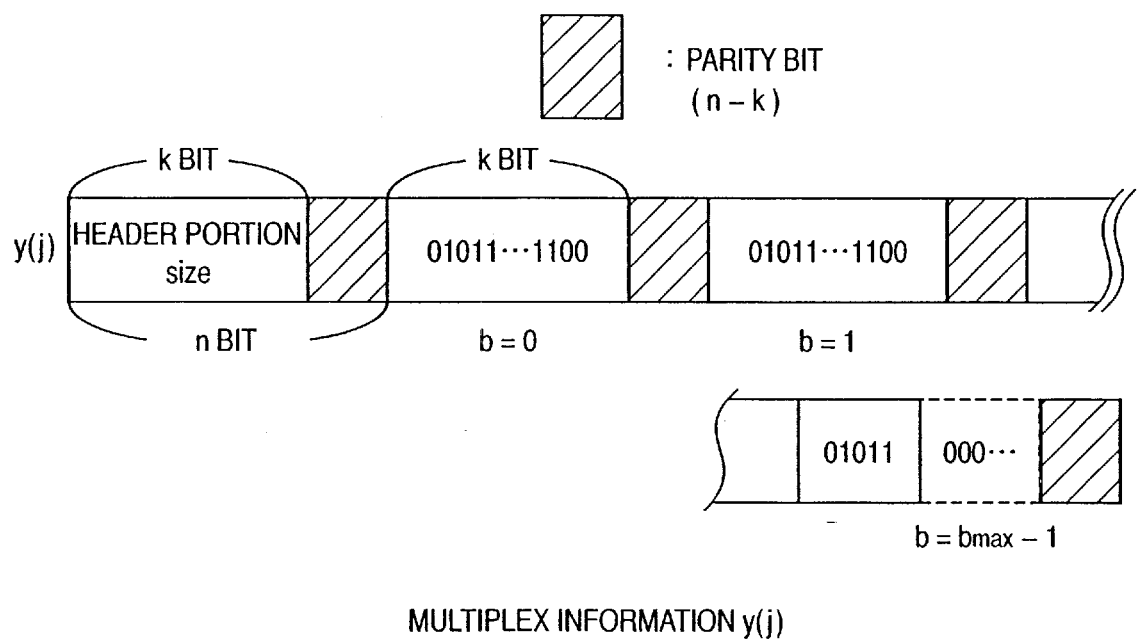

As a result of performing the above-described processing, the multiplex information $y(j):(0 \leq j \leq n(b_{max}+1))$ shown in FIG. 4B is outputted.

In the foregoing manner, multiplex information having an error correction code is generated with respect to the additive information subjected to multiplexing. Then, the multiplex information is embedded in an actual image and printed out by the printer 104.

Next, descriptions are provided on operation for reading the printout and reproducing additive information.

Figure 5:
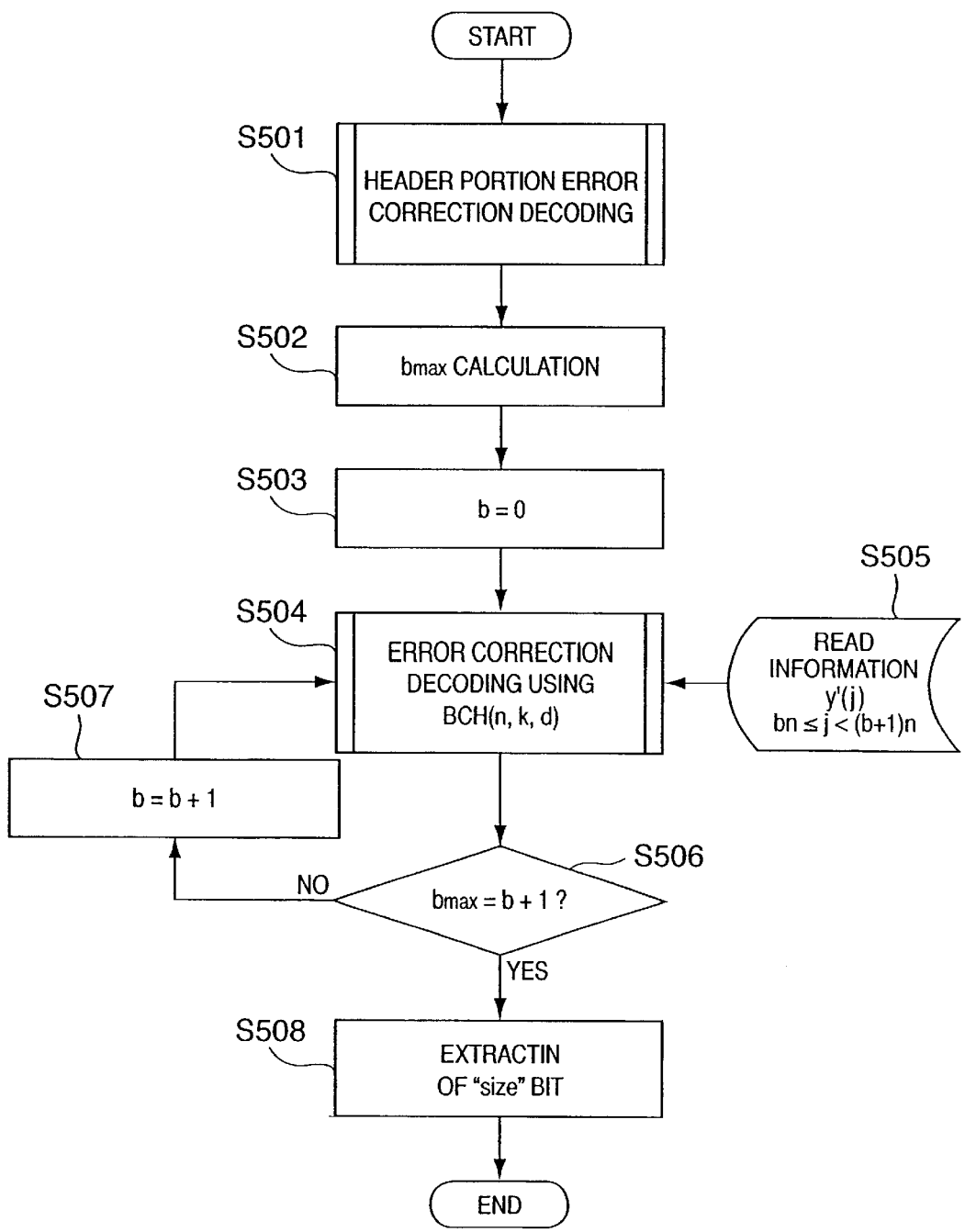
FIG. 5 is a flowchart showing processing steps of an error correction decoder according to the embodiment.

FIG. 5 is a flowchart showing processing steps of the error correction decoder 107 according to the first embodiment. Hereinafter, descriptions are provided with reference to FIG. 5.

The first n bit is extracted from y'(j), inputted by the additive information separation unit 106, and subjected to error correction decoding at step S501. As a result, the number of bits "size" of additive information can be obtained. Once this value is obtained, $b_{max}$ indicative of the number of encoding blocks can be obtained by equation (1.1) similar to the encoding processing (step S502).

The subsequent processes are the same as those processes in encoding. At step S503, initialization (b=0) is performed. At steps S504–S507, error correction decoding using BCH (n, k, d) is performed on all the blocks of additive information y'(j).

As a result of the foregoing processing, a bit stream having $k \cdot b_{max}$ bits (>size), on which error correction decoding has been performed, can be obtained by linking significant bits of each block. At step S508, the first "size" bit is extracted and outputted as decoded additive information (e.g., image data and additive information are respectively displayed).

As a result of the foregoing processing, the first embodiment achieves extraction of far more reliable additive information compared to the conventional technique.

[Second Embodiment]

The first embodiment enables stable additive information reading by performing error correction encoding on additive information, which is subjected to multiplexing to an image. However, the first embodiment has the following problem.

Normally, in a case where information including an error correction code is transmitted through a channel having a large error rate, it is necessary to use a large number of parity bits. In this case, the volume of information subjected to transmission decreases. On the other hand, if the volume of information subjected to transmission is to be increased, the number of parity bits must be decreased. In such case, the error correction capability is reduced. In other words, the correction capability of an error correction code and the volume of information subjected to transmission have trade-off relations. If error correction is performed with an excessive correction capability in a channel having a small error rate, unnecessary parity bits are wasted. In order to realize data transfer without a waste, the error correction code must be designed most appropriately in accordance with a channel.

According to this embodiment, the aforementioned channel corresponds to a print medium, such as paper or the like. In view of the above discussion, the error correction code must most appropriately be designed in accordance with the type of print medium; however, the first embodiment has given an example of employing only one type of error correction code. The second embodiment takes the above-described problem into consideration.

Hereinafter, the second embodiment is described with reference to the accompanying drawings. Note that the image processing apparatus of the second embodiment is efficient if incorporated as printer driver software or application software in a computer (e.g., personal computer or the like) to mainly generate image data to be outputted to a printer engine. It is also effective to incorporate the image processing apparatus in a copying machine, facsimile apparatus, printer main body or the like as hardware or software.

Figure 6A:
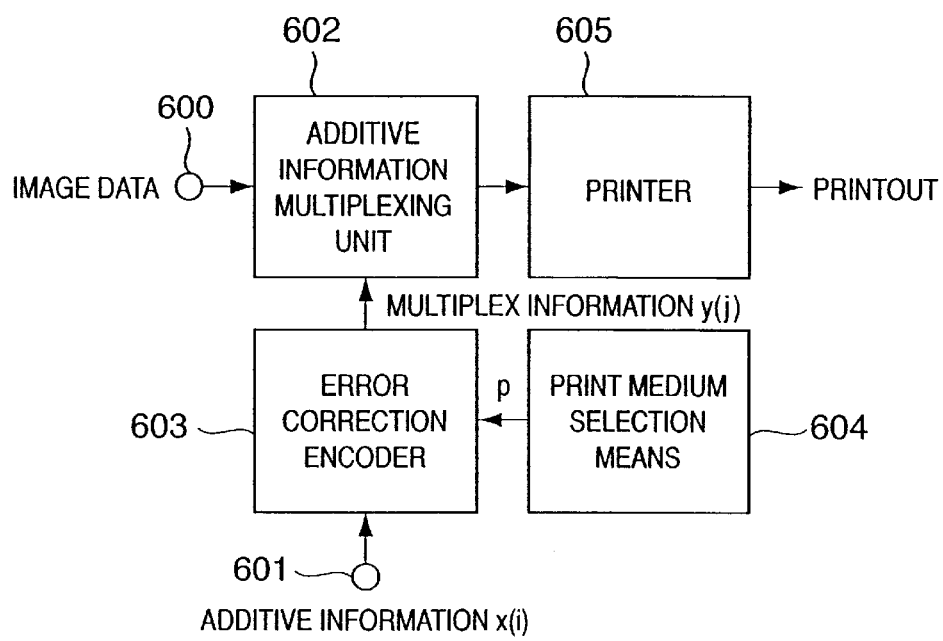
FIGS. 6A and 6B are block diagrams of a data multiplexing apparatus according to a second embodiment of the present invention.
Figure 6B:
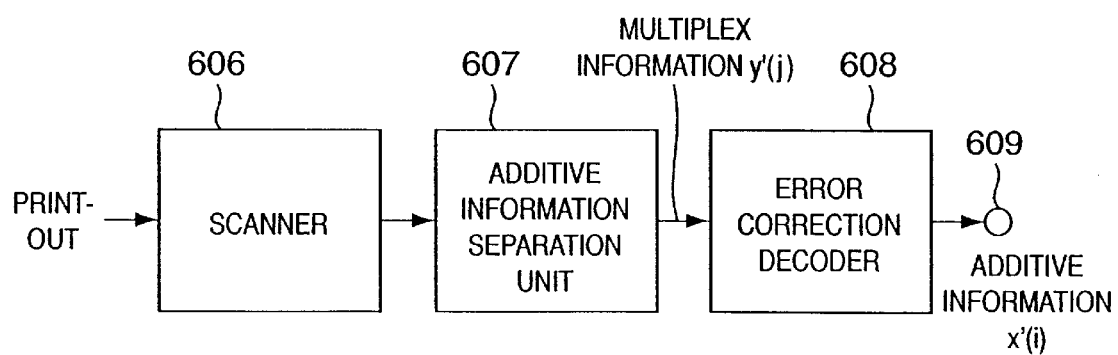

FIGS. 6A and 6B are block diagrams showing a construction of an image processing apparatus according to the second embodiment. The construction differs from the first embodiment by having print medium selection means 604. Although various types of print media may be used, the second embodiment assumes four types of print media shown in the table 700 in FIG. 7. As shown in the table, since an average detection rate achieved at the time of reading multiplexed information is different for each print medium, the most appropriate error correction code parameters n, k, and d are designed in advance for each print medium, and stored in association with the print medium identification parameter p. Assume that the table (hereinafter referred to as parameter table 700) is stored in advance in the ROM 302 or secondary storage device 304 shown in FIG. 3. The print medium selection means selects a print medium by having a user directly input the type of print medium using a GUI on an application program or having the printer automatically determine the type of paper, and then obtains the print medium identification parameter p. The obtained value p is inputted to the error correction encoder and n, k, and d are determined.

Figure 8:
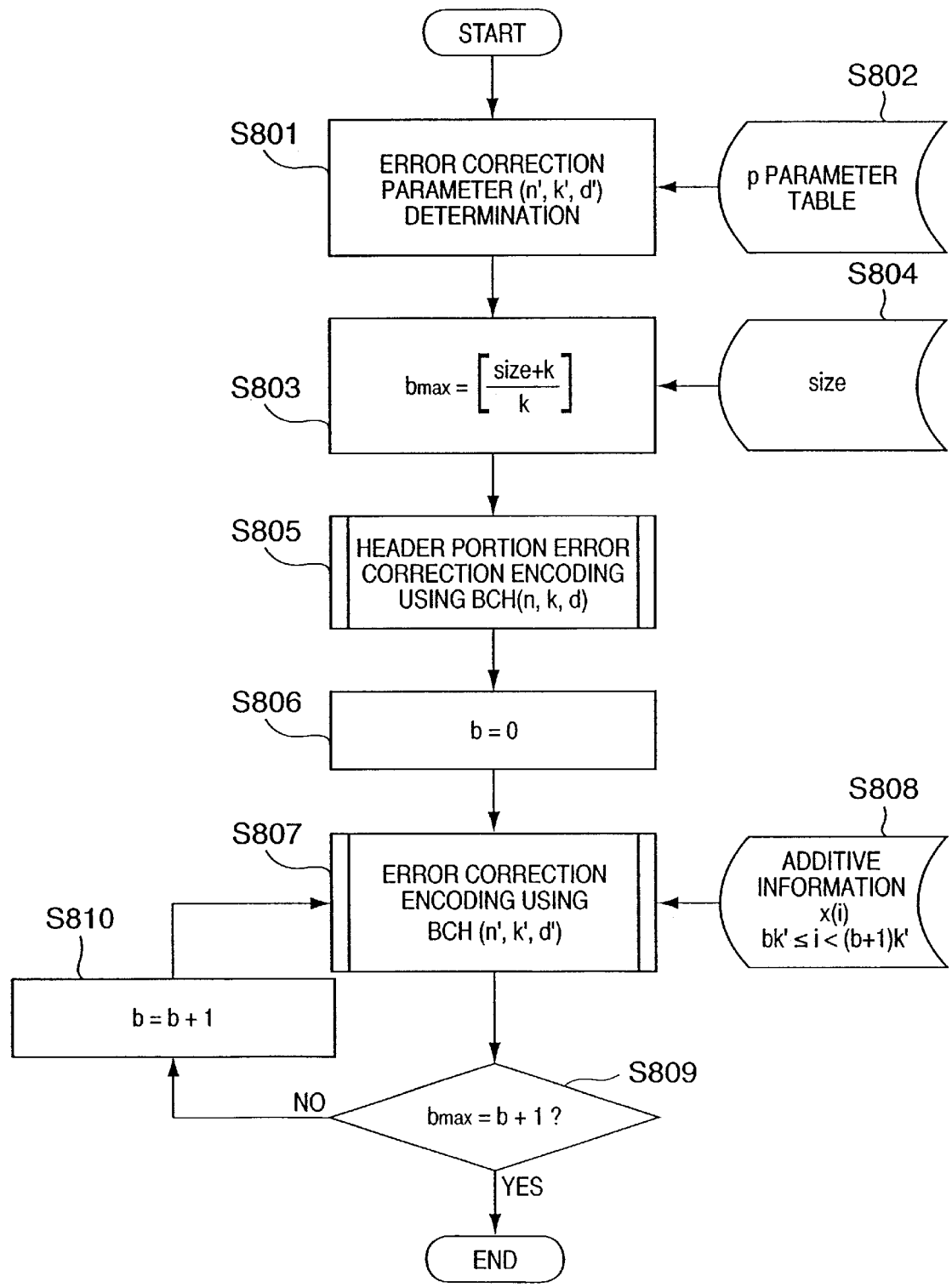
FIG. 8 is a flowchart showing processing steps of an error correction encoder according to the second embodiment.

FIG. 8 is a flowchart showing processing steps of error correction encoder 603. Hereinafter, descriptions are provided with reference to FIG. 8.

At step S801, the parameter table 700 is referred to based on a print medium identification parameter p, which has been obtained by the print medium selection means 604, in order to determine encoding parameters n', k', and d' of the BCH code. At step S803, $b_{max}$ indicative of the number of encoding blocks of additive information can be obtained by equation (1.1) similar to that described in the first embodiment.

At step S805, a header portion is generated. This processing is described with reference to FIGS. 9A and 9B. The header portion is subjected to error correction encoding using BCH(n, k, d). In the second embodiment, these parameters are fixed for any print medium. Since decoding of the header portion of multiplex information must be ensured for any print medium, at step S805, encoding of the header is performed normally with a code having a higher correction capability than that shown in the parameter table in FIG. 7, e.g., BCH (255, 45, 87).

Figure 9A:
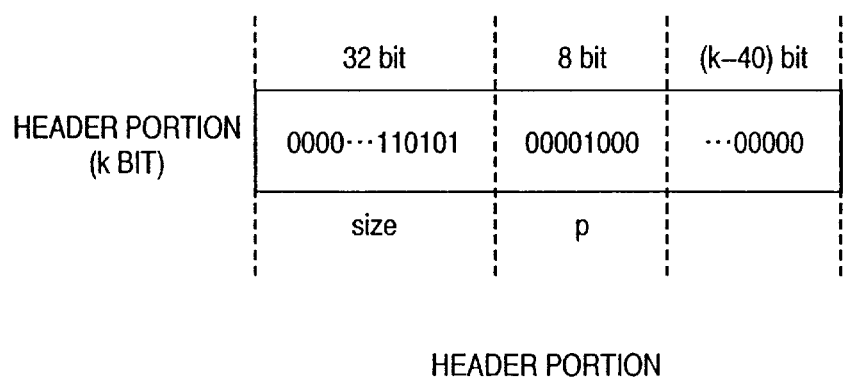
FIG. 9A is a view of a header portion and FIG. 9B is an example of a bit stream after error correction encoding according to the second embodiment.

FIG. 9A shows an example of a generated header portion. In FIG. 9A, "size" indicative of a volume of additive information is stored in the first 32 bits counted from the top, and the print medium identification parameter p is stored in the subsequent 8 bits. Assuming that this header portion is subjected to error correction using BCH (255, 45, 87), since k=45, the remaining 5 bits become a remainder.

Figure 9B:
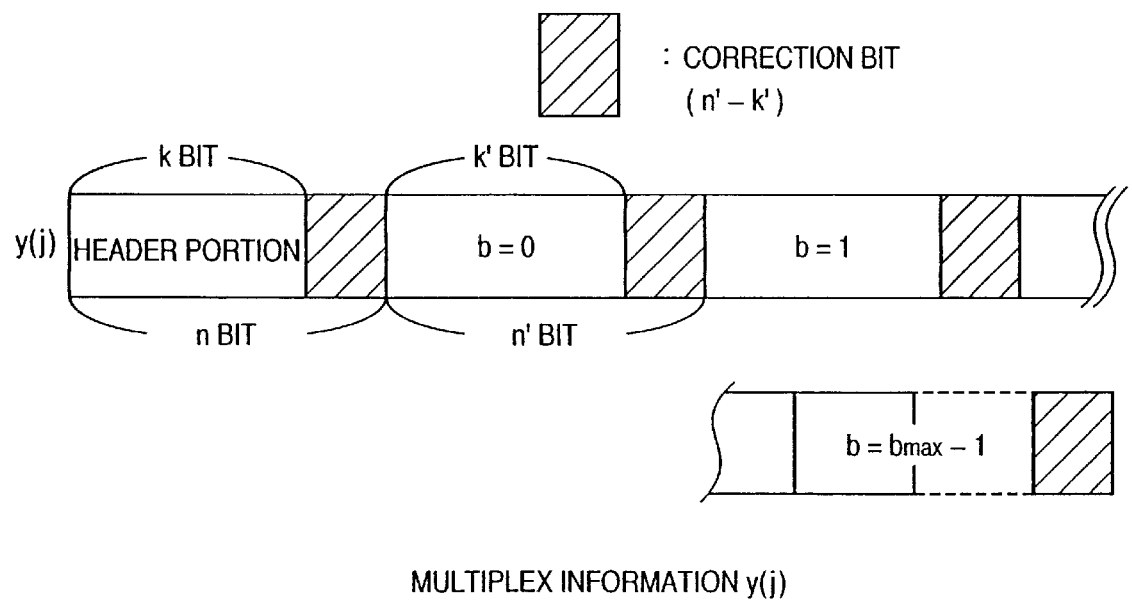

After the header portion is encoded, initialization (b=0) is performed at step S806. At steps S807–S810, error correction encoding using BCH(n', k', d') is performed according to the encoding parameters determined at step S801. FIG. 9B shows multiplex information y(j) outputted as a result of error correction encoding. It should be noted that only the header portion is encoded with BCH (n, k, d), while the additive information is encoded with BCH(n', k', d').

Figure 10:
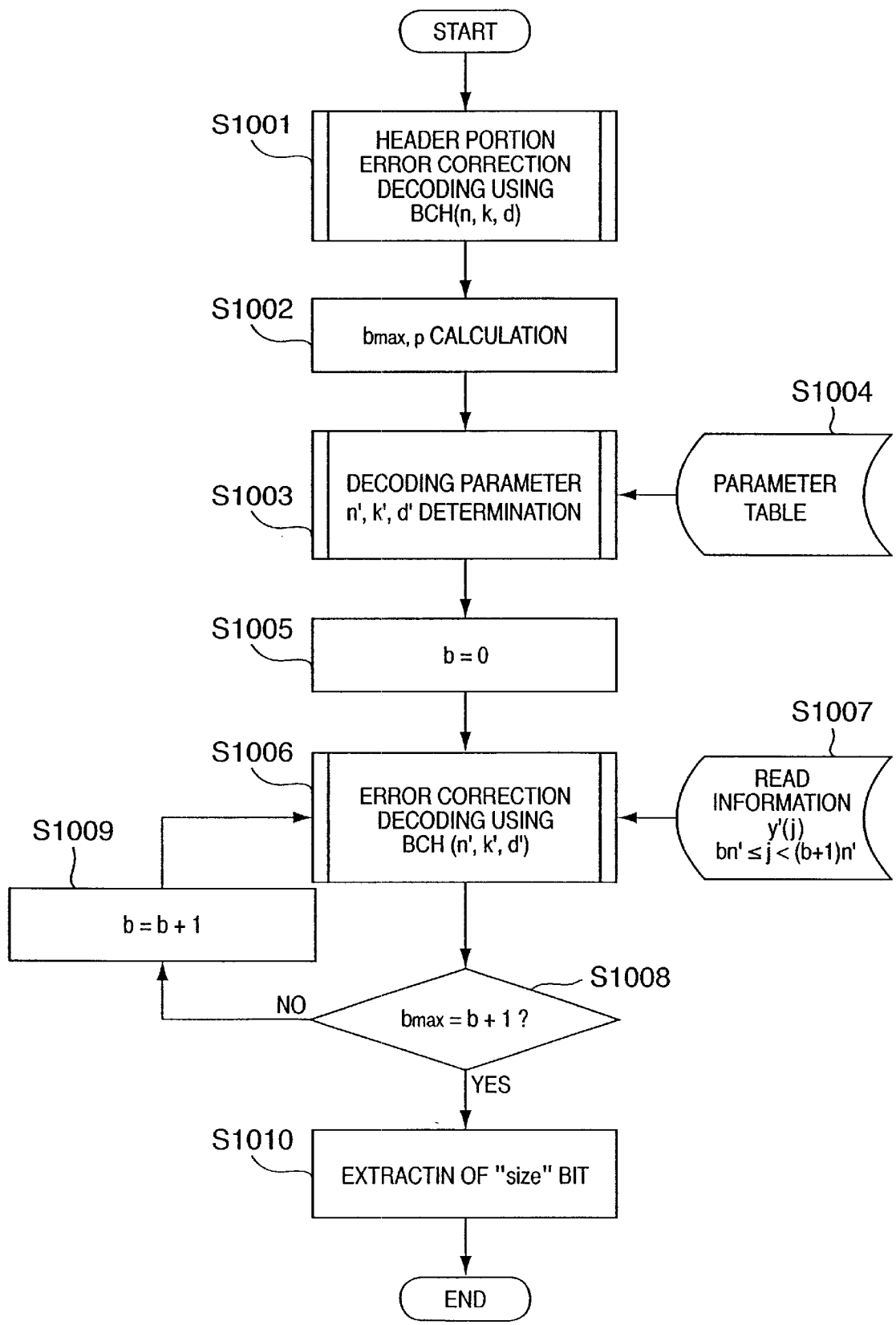
FIG. 10 is a flowchart showing processing steps of an error correction decoder according to the second embodiment.
Figure 11A:
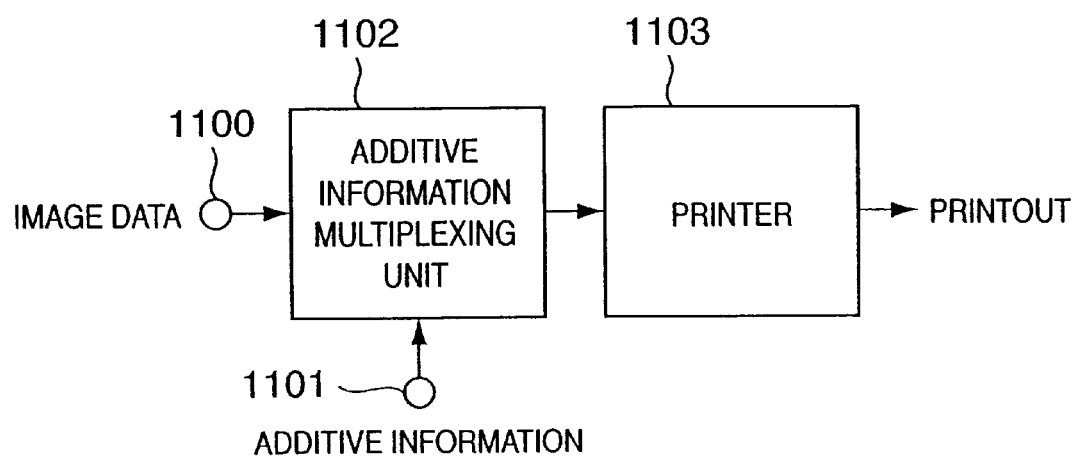
FIGS. 11A and 11B are block diagrams showing a construction of a data multiplexing apparatus proposed by the assignee of the present invention.
Figure 11B:
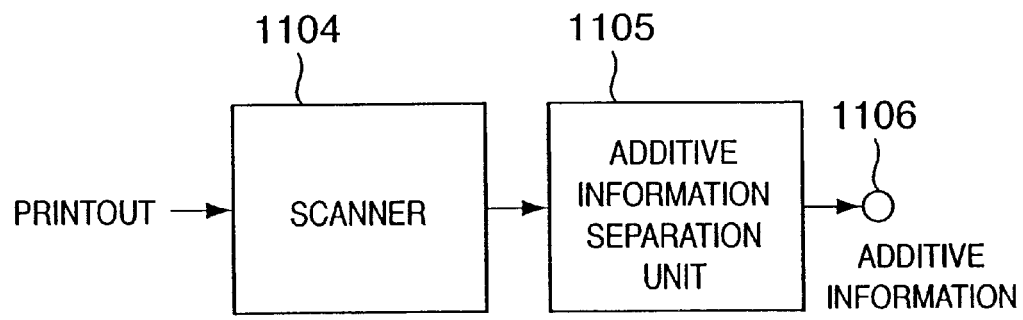

Next, processing steps of the error correction decoder are described with reference to FIG. 10.

At step S1001, regardless of the type of print medium, error correction decoding using BCH(n, k, d) is performed on the top portion (n bits) of y'(j) inputted from the additive information separation unit. At step S1002, based on the "size" indicative of a volume of additive information stored in the header portion, $b_{max}$ indicative of the number of encoding blocks is obtained by equation (1.1), and a paper type identification parameter p is also obtained. At step S1003, decoding parameters n', k', and d' are obtained by referring to the parameter table 700, stored in advance, based on the obtained parameter p.

Note that n', k', and d' may directly be embedded to the header instead of embedding the parameter p. However in this case, since the number of data is three, the probability of decoding all three data, which cause an error, decreases. For this reason, it is preferable to embed the parameter p as described above.

The subsequent decoding processing is performed with the use of the obtained decoding parameters in the similar manner to that described in the first embodiment.

Although each of the additive information multiplexing apparatus and additive information separation apparatus is described above, the present invention is not limited to the combination of these apparatuses.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium (or recording medium), storing program codes of a software realizing the above-described functions of the embodiments, to a computer system or apparatus, reading the program codes, by a CPU or MPU of the computer system or apparatus, from the storage medium, then executing the program. In this case, the program codes read from the storage medium realize the functions according to the embodiments, and the storage medium storing the program codes constitutes the invention. Furthermore, besides aforesaid functions according to the above embodiments are realized by executing the program codes which are read by a computer (e.g., personal computer), the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been described above, according to the foregoing embodiments, when additive information is multiplexed to image data without deteriorating quality of the image data, the above-described embodiments perform error correction encoding on the additive information and at the same time multiplexes parity bits to the image by making use of the changes in texture generation, incident to changing quantization conditions of an error diffusion method, to code embedding. Accordingly, errors generated at the time of reading multiplexed information can be corrected and the additive information can be read without an error.

Furthermore, by making the correction capability of an error correction code variable in accordance with a print medium, wastes produced at the time of multiplexing additive information can be reduced.

Moreover, since additive information can easily be multiplexed to image data, it is possible to provide services or applications for embedding audio data or confidential information to image data. Further, it is possible to suppress unauthorized forgery of bills, stamps, securities and so on, or prevent violation of copy right of image data.

As has been set forth above, according to the present invention, in a case where additive information is multiplexed to an image and the image is printed, it is possible to extract the additive information with high precision.

The present invention is not limited to the above embodiments and various changes and modifications can be made within the spirit and scope of the present invention. Therefore, to apprise the public of the scope of the present invention, the following claims are made.

What is claimed is:

1. A data processing apparatus for multiplexing additive information to image data and printing the image data by predetermined printing means, comprising:

header generation means for generating header block information including at least information indicative of a size of the additive information and information for error correction; and block generation means for dividing the additive information into blocks each having a predetermined size, and generating block information including error correction code information by adding error correction code information to each block, wherein the information generated by said header generation means and block generation means is multiplexed to the image data and printed, and wherein said header generation means embeds information, which identifies a type of print medium used in printing, in the header block.

2. The data processing apparatus according to claim 1, wherein a code length for error correction, included in the header information, which is generated by said header generation means, is fixed.

3. The data processing apparatus according to claim 1, further comprising:

setting means for setting a type of print medium used by said printing means; and identification means for identifying a number of bits of additive information and a number of bits of error correction code information in a block, based on the type of print medium set by said setting means, wherein said block generation means generates block information including error correction code information of additive information, based on information identified by said identification means.

4. The data processing apparatus according to claim 3, wherein said identification means performs identification by referring to a table storing an error correction encoding parameter according to a type of print medium.

5. The data processing apparatus according to claim 1, wherein the error correction code information is generated by using a BCH code.

6. A data processing method of multiplexing additive information to image data and printing the image data by predetermined printing means, comprising:

a header generation step of generating header block information including at least information indicative of a size of the additive information and information for error correction; and a block generation step of dividing the additive information into blocks each having a predetermined size, and generating block information including error correction code information by adding error correction code information to each block, wherein the information generated at said header generation step and block generation step is multiplexed to the image data, and wherein said header generation step embeds information, which identifies a type of print medium used in printing, in the header block.

7. A storage medium storing program codes which function as a data processing apparatus for multiplexing additive information to image data and printing the image data by predetermined printing means, said storage medium comprising:

program codes for a header generation step of generating header block information including at least information indicative of a size of the additive information and information for error correction;

program codes for a block generation step of dividing the additive information into blocks each having a predetermined size, and generating block information including error correction code information by adding error correction code information to each block; and program codes for multiplexing information, generated at said header generation step and block generation step, to the image data, and wherein said header generation step embeds information, which identifies a type of print medium used in printing, in the header block.

8. A data processing apparatus for reading an original image, to which additive information is multiplexed, by image reading means and extracting the multiplexed additive information, comprising:

first error correction means for extracting header information, including control information for controlling reading of the additive information, together with error correction code information of the header information, to perform error correction of the header information;

second error correction means for extracting subsequent additive information in a predetermined block size unit based on the control information corrected by said first error correction means, and performing error correction based on error correction code information accompanying the extracted block; and extraction means for extracting the additive information by linking information corrected by said second error correction means.

9. The data processing apparatus according to claim 8, wherein the control information includes information indicative of a size of the additive information and information indicative of a type of print medium of the original image, and said first error correction means determines a number of blocks, and a number or error correction bits or a number of bits of additive information in each block based on the size of the additive information or the type of print medium, and then performs error correction.

10. A data processing method of reading an original image, to which additive information is multiplexed, by image reading means and extracting the multiplexed additive information, comprising:

a first error correction step of extracting header information, including control information for controlling reading of the additive information, together with error correction code information of the header information, to perform error correction of the header information;

a second error correction step of extracting subsequent additive information in a predetermined block size unit based on the control information corrected at said first error correction step, and performing error correction based on error correction code information accompanying the extracted block; and an extraction step of extracting the additive information by linking information corrected at said second error correction step.

11. A storage medium storing program codes which function as a data processing apparatus for reading an original image, to which additive information is multiplexed, by image reading means and extracting the multiplexed additive information, said storage medium comprising:

program codes for a first error correction step of extracting header information, including control information for controlling reading of the additive information, together with error correction code information of the header information, to perform error correction of the header information;

program codes for a second error correction step of extracting subsequent additive information in a predetermined block size unit based on the control information corrected at said first error correction step, and performing error correction based on error correction code information accompanying the extracted block; and program codes for an extraction step of extracting the additive information by liking information corrected at said second error correction step.

* * * * *

UNITED STATES PATENT AND TRADEMARK OFFICE
CERTIFICATE OF CORRECTION

PATENT NO. : 6,753,979 B2
DATED : June 22, 2004
INVENTOR(S) : Kiyoshi Umeda

It is certified that error appears in the above-identified patent and that said Letters Patent is hereby corrected as shown below:

Drawings
Sheet 5, Figure 5, item S508, "EXTRACTIN" should read -- EXTRACTION --.
Sheet 7, Figure 7, "HIGHH" should read -- HIGH --.
Sheet 10, Figure 10, item S1010, "EXTRACTIN" should read -- EXTRACTION --.

Column 2,
Line 3, "copy right" should read -- copyright --.

Column 3,
Line 55, "copy right" should read -- copyright --.

Column 8,
Line 23, "copy right" should read -- copyright --.

Column 10,
Line 13, "number or" should read -- number of --.
Line 57, "liking" should read -- linking --.

Signed and Sealed this

Twenty-sixth Day of April, 2005

JON W. DUDAS
*Director of the United States Patent and Trademark Office*